ized.

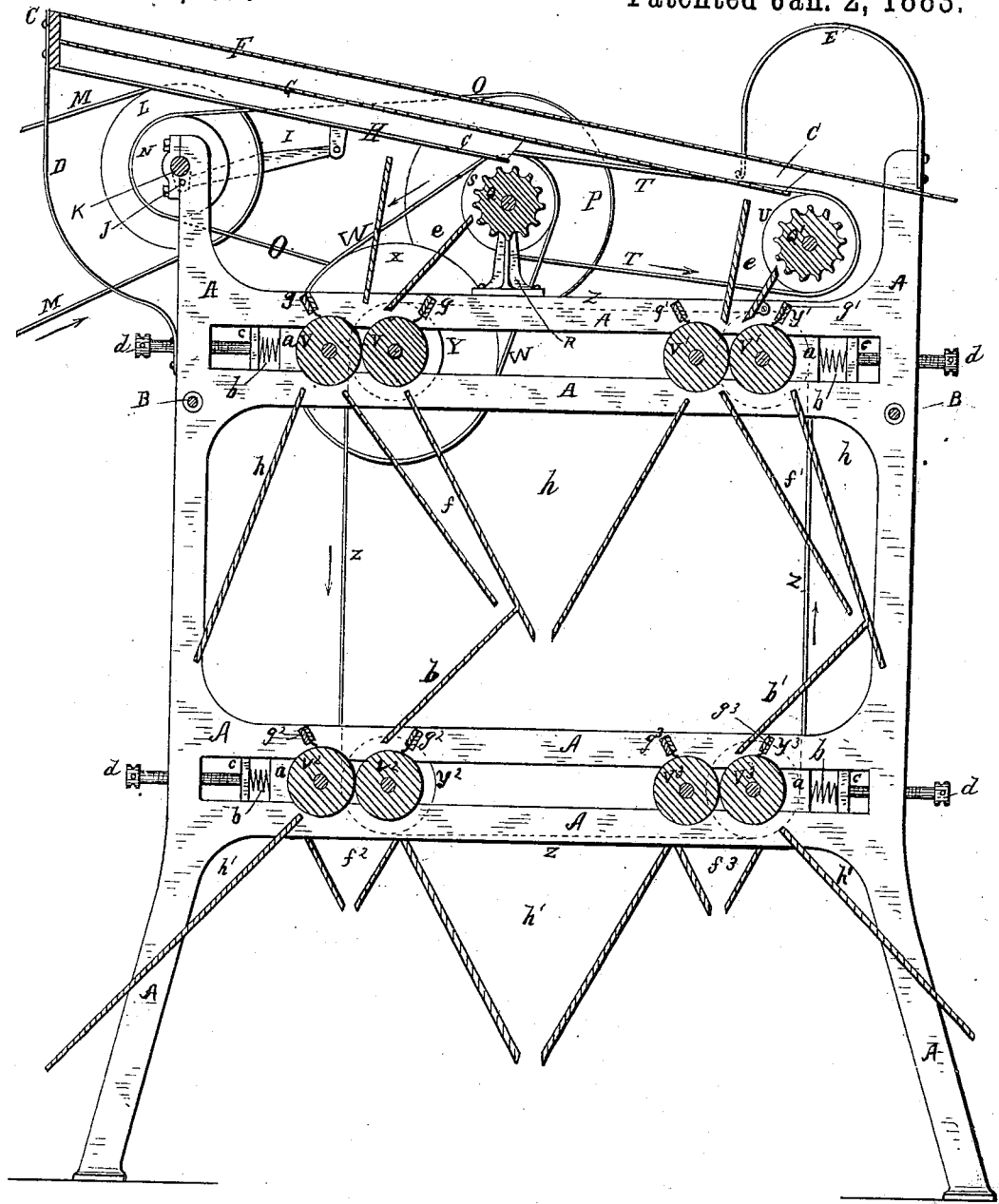

UNITED STATES PATENT OFFICE.

JUDSON N. MERCHANT, OF BLOOMINGDALE, MICHIGAN.

WHEAT-GRADER AND COCKLE-SEPARATOR.

SPECIFICATION forming part of Letters Patent No. 269,872, dated January 2, 1883.

Application filed April 4, 1882. (No model.)

*To all whom it may concern:*

Be it known that I, JUDSON NEWELL MERCHANT, of Bloomingdale, in the county of Van Buren and State of Michigan, have invented a new and useful Improvement in Wheat-Graders and Cockle-Separators, of which the following is a full, clear, and exact description.

Reference is to be had to the accompanying drawing, forming part of this specification, which is a sectional elevation of my improvement.

The object of this invention is to separate the larger and small kernels of wheat and remove cockle and other small seeds therefrom.

My invention relates to improvements in wheat-graders and cockle-separators; and it consists in the peculiar construction and arrangement of parts, as hereinafter more fully set forth.

A are the side frames of my machine, which are connected by tie-rods B, and have a casing attached to them. The casing is not shown in the drawing.

C is the screen-shoe, which is placed in an inclined position, and is supported at its upper end by upwardly-projecting springs D and at its lower end by arched springs E. The lower ends of the springs D E are attached to the frame A. The shoe C is provided with a long upper screen, F, a shorter screen, G, and a bottom board, H, shorter than the screen G. The screens F G are made of perforated zinc or other suitable material. The openings or meshes of the upper screen, F, are of such a size that the larger kernels of wheat will pass down the said screen F and fall from its lower end into some suitable receiver, while the smaller kernels of wheat, the cockle-seed, and other small seeds will pass through the screen F and fall upon the screen G. The openings or meshes of the screen G are made of such size that the smaller kernels of wheat will pass down the said screen and fall from its lower end, while the cockle-seed and other small seeds will pass through the said screen G and fall upon and slide down the bottom board, H.

To the shoe C is hinged the end of a connecting-rod, I, the other end of which is connected with an eccentric or crank, J, formed upon or attached to the drive-shaft K. The drive-shaft K works in bearings attached to the frame A, and has a pulley, L, attached to its end to receive a belt, M, to which motion is given from any convenient power. By this construction the screen-shoe C will be vibrated by the revolution of the drive-shaft K.

To the shaft K is attached a smaller pulley, N, around which passes a belt, O, which also passes around a large pulley, P, attached to the cylinder Q. The journals of the cylinder Q work in bearings in brackets R, attached to the frame A, and to the said cylinder Q is attached a small pulley, S, around which passes a belt, T. The belt T also passes around a small pulley, U, attached to the cylinder Q', the journals of which revolve in bearings attached to the frame A, so that both the cylinders will be revolved from the drive-shaft K.

To the upper part of the frame A, below the level of the cylinders Q Q', are pivoted two pairs, V V', of rubber or rubber-faced rolls.

To the lower part of the frame A are pivoted two pairs of rubber or rubber-faced rolls, V² V³.

The pulley S is made long to receive a belt, W, or has another pulley connected with it to receive the said belt W. The belt W also passes around a large pulley, X, attached to a journal of one of the rollers, V.

To the pulley X, or to the journal with which the said pulley is connected, is attached a small pulley, Y, around which passes a belt, Z. The belt Z also passes around pulleys Y' Y² Y³, attached respectively to a roll of each pair V' V² V³, so that the four pairs of rolls will be driven by the same belt Z.

The bearings $a$ of the outer roll of each pair are movable, and are held forward by spiral or other springs, $b$, interposed between the said bearings $a$ and bars $c$, which are held forward by screws $d$, so that the outer rolls can be adjusted to bear against their respective inner rolls with any desired pressure.

The cylinders Q Q' are corrugated longitudinally, so as to receive the seed and small wheat from the lower ends of the bottom board, H, and the lower screen, G, and discharge the said seeds into the spouts $e$, by which the seeds are guided into the angular spaces between the rolls V V and V' V'. As the rolls V V and V' V' revolve the kernels of wheat and any small seeds that may still be with the wheat fall into the spouts $f$ $f'$ and are conducted to the pairs of rolls V² V³, by which the remaining small seeds are removed, the wheat passing through the spouts $f^2 f^3$ into some suitable receiver. The small seeds adhere to the faces of the rubber rolls V V' $V^2$ $V^3$ until brushed off by the brushes $g$ $g'$ $g^2$ $g^3$. The small seeds from the upper rolls, V V', fall into the spouts $h$, by which they are guided into the spouts $h'$. The small seeds from the lower rolls, $V^2$ $V^3$, fall directly into the spouts $h'$, by which all the small seeds are conducted out of the machine or into some suitable receiver. By this construction the wheat will be divided into two grades, and all the small seeds will be separated from the wheat, the work being done rapidly and thoroughly.

Having thus fully described my invention, I claim as new and desire to secure by Letters Patent—

1. A wheat-grader and cockle-separator constructed substantially as herein shown and described, and consisting of the shoe C, having screens F G and bottom board, H, of different lengths, the corrugated cylinders Q Q', the pairs of rubber rolls V V' $V^2$ $V^3$, and means for vibrating the shoe and rotating the cylinders and rolls, as set forth.

2. In a wheat-grader and cockle-separator, the combination, with the shoe C, having screens F G and bottom board, H, and the corrugated cylinders Q Q', of the rubber rollers V V' $V^2$ $V^3$, and the brushes $g$ $g'$ $g^2$ $g^3$, substantially as and for the purpose set forth.

3. In a wheat-grader and cockle-separator, the combination, with the drive-shaft K, the corrugated cylinders Q Q', and the rubber rollers V V' $V^2$ $V^3$, of the pulleys L N P S U X Y Y' $Y^2$ $Y^3$, and the belts O T W Z, substantially as and for the purpose set forth.

4. In a wheat-grader and cockle-separator, the combination, with the shoe C and the corrugated cylinders Q Q', of the spouts $e$, the rubber rollers V V' $V^2$ $V^3$, the brushes $g$ $g'$ $g^2$ $g^3$, the spouts $f$ $f'$ $h$ $h'$, and means for operating said shoe, cylinders, and rollers, substantially as and for the purpose set forth.

JUDSON N. MERCHANT.

Witnesses:
RANSOM S. BABCOCK,
WILLIAM H. PERKINS.